(12) United States Patent
Hester et al.

(10) Patent No.: US 7,019,686 B2
(45) Date of Patent: Mar. 28, 2006

(54) RF CHANNEL CALIBRATION FOR NON-LINEAR FM WAVEFORMS

(75) Inventors: Jeffrey A. Hester, Issaquah, WA (US); Dawn M. Gidner, Redmond, WA (US); Gloria M. Logan, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 187 days.

(21) Appl. No.: 10/788,932

(22) Filed: Feb. 27, 2004

(65) Prior Publication Data

US 2005/0190100 A1     Sep. 1, 2005

(51) Int. Cl.
*G01S 7/40*     (2006.01)
*G01S 13/28*     (2006.01)

(52) U.S. Cl. .................. 342/174; 342/165; 342/204
(58) Field of Classification Search ................ 342/165, 342/174, 204
See application file for complete search history.

(56) References Cited

U.S. PATENT DOCUMENTS

| | | | |
|---|---|---|---|
| 5,264,852 A | | 11/1993 | Marquet |
| 5,552,793 A | * | 9/1996 | McLeod et al. ............ 342/204 |
| 6,067,043 A | | 5/2000 | Faure et al. |
| 6,150,976 A | * | 11/2000 | Cooley ....................... 342/165 |

FOREIGN PATENT DOCUMENTS

GB     2209643 A   *   5/1989

OTHER PUBLICATIONS

Green R A et al.; Considerations for quadrature receiver calibration using frequency weighed least squares FIR filter design; 2002 IEEE International Symposium on Electomagnetic Compatibility; Minneapolis, MN; Aug. 19-23, 2002.

Rostan F; The calibration of the MetOp/Advanced scattermeter(ASCAT); Institute of Electrical and Electronics Engineers; IEEE 2000 International Geoscience and Remote Sensing Symposium; Honolulu, Hawaii; Jul. 24-28, 2000.

* cited by examiner

*Primary Examiner*—Ian J. Lobo
(74) *Attorney, Agent, or Firm*—Honeywell Int'l Inc.

(57) ABSTRACT

A system, method, and computer program product that performs self-calibration of pulse-compression radar signals. The system includes an antenna, a receiver, a transmitter, and a radar signal processor. Under normal (non-calibration) operation the radar transmitter generates a pulse compression waveform and transmits it via the antenna. Any reflections from this waveform are detected by the same antenna and processed by the receiver. The received radar signal then undergoes pulse compression followed by more mode-specific processing (windshear, weather, ground map, etc.) by the radar processor. During calibration, the radar transmitter generates a similar pulse compression waveform (i.e., calibration pulses), but the calibration pulses bypass the antenna and go directly to the receiver via a "calibration path" built into the hardware. The resulting calibration pulses are used to generate a calibration filter. The calibration filter is applied to the received radar signals in the frequency domain either before or after pulse compression.

27 Claims, 6 Drawing Sheets

RF CHANNEL CALIBRATION FOR NON-LINEAR FM WAVEFORMS

FIELD OF THE INVENTION

This invention relates generally to radar and more specifically to weather radar calibration.

BACKGROUND OF THE INVENTION

Some Weather Radar systems, such as the Honeywell RDR-4000, transmit pulse compression waveforms whose received signals are pulse compressed during processing. (Some examples of pulse compression waveforms are linear or non-linear FM chirped pulses, Barker codes, etc.) Processing the received data requires that both the transmitted pulse compression waveforms and the received radar signals pass through a system with flat amplitude and linear phase across the bandwidth of the pulse. Phase and amplitude errors in the front end of the system result in degraded system performance by distorting the transmitted and received signals, thereby increasing the range sidelobes after compression. To achieve the required system performance these errors must be held to a fixed level. However, the error budget required for the analog front end is too stringent to guarantee by design over all operating conditions. Because some of the distortion is created by non-linearities in the risetime of the transmitter, traditional frequency-only equalization techniques are not adequate to correct all the errors in the channel. The errors will be different for different waveforms.

The hardware of the weather radar could be improved to be more robust and thereby reduce distortion to an acceptable level. However, this solution would produce a physically larger weather radar system with significant increases in cost per unit.

Therefore, there exists a need for reducing distortion in a pulse-compression weather radar system without increasing hardware complexity and without significantly increasing cost per unit.

SUMMARY OF THE INVENTION

The present invention is a system, method, and computer program product that performs self-calibration of received pulse-compression radar signals. The system includes an antenna, a receiver, a transmitter, and a radar signal processor. Under normal (non-calibration) operation the radar transmitter generates a pulse compression waveform and transmits it via the antenna. Any reflections from this waveform are detected by the same antenna and processed by the receiver. Front-end processing next involves analog to digital conversion and may also include several intermediate processing stages. The resulting digitized, preprocessed, received radar signal then undergoes pulse compression followed by more mode-specific processing (windshear, weather, ground map, etc.) by the radar processor.

During calibration, the radar transmitter generates a similar pulse compression waveform (i.e., calibration pulses), but instead of being transmitted to the antenna the calibration pulses are sent directly to the receiver via a "calibration path" built into the hardware. In one aspect of the invention, the calibration pulses are transmitted via the antenna, as well as being sent directly to the receiver by way of a calibration path. The calibration signals also undergo normal front-end pre-processing prior to being sent to the radar processor. The resulting calibration pulses are then used, along with a previously defined ideal signal and an estimate of the noise level of the calibration path, to generate a set of frequency domain weighting factors. These weighting factors are then normalized with respect to noise gain to create the calibration filter. In one aspect of the invention, the radar processor modifies the calibration filter based on previously generated associated calibration filters.

The calibration filter is applied to the received radar signals in the frequency domain either before or after pulse compression.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
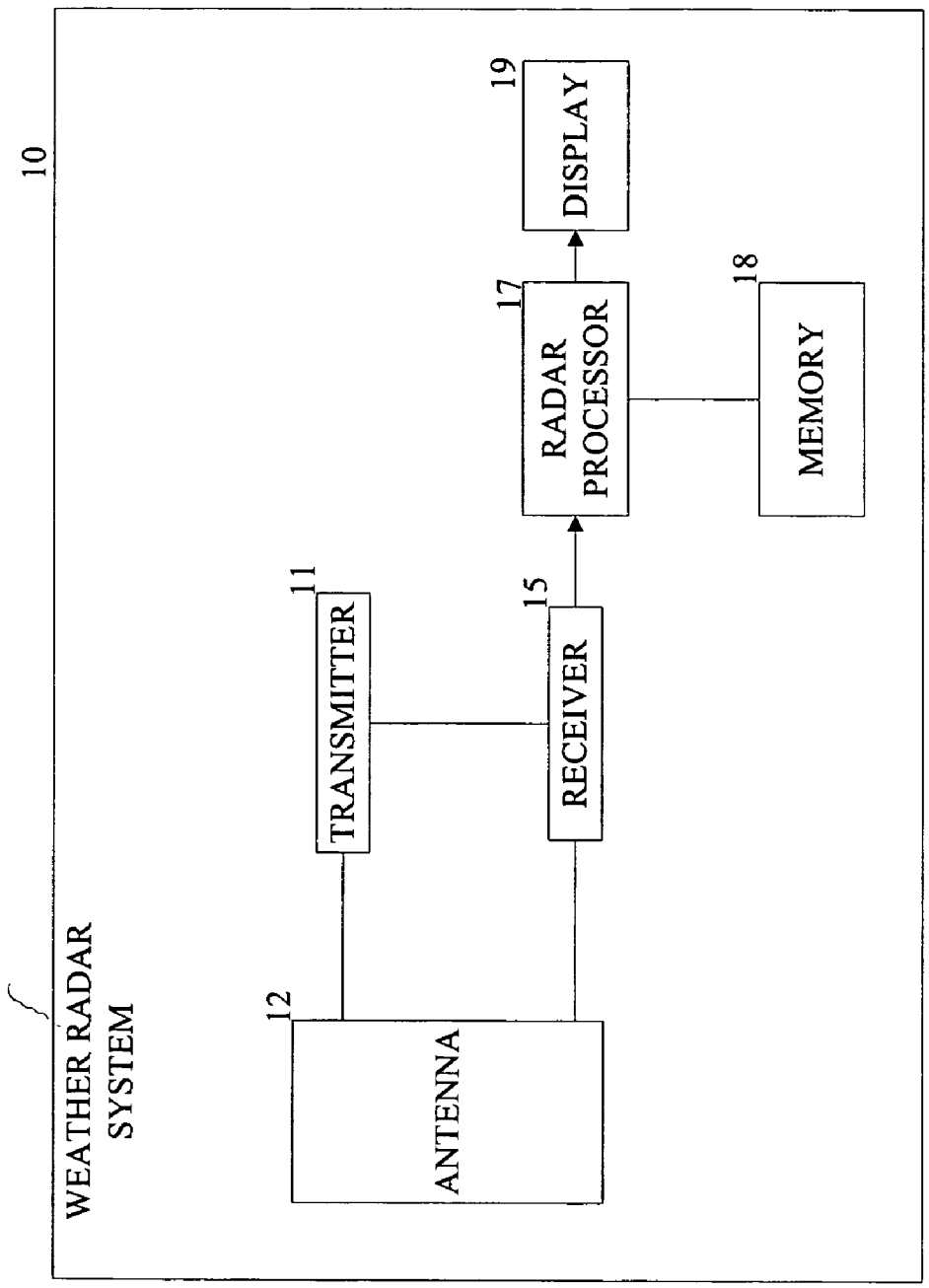
FIG. 1 illustrates a block diagram of an example weather radar system formed in accordance with the present invention.

FIG. 1 illustrates a pulse-compression weather radar system 10 that determines a calibration filter using the actual waveforms produced by the radar system 10 and uses this filter when processing the received pulse compression radar signals. The radar system 10 includes a transmitter 11, an antenna 12, a receiver 15, and a radar processor 17 with memory 18.

Figure 2:
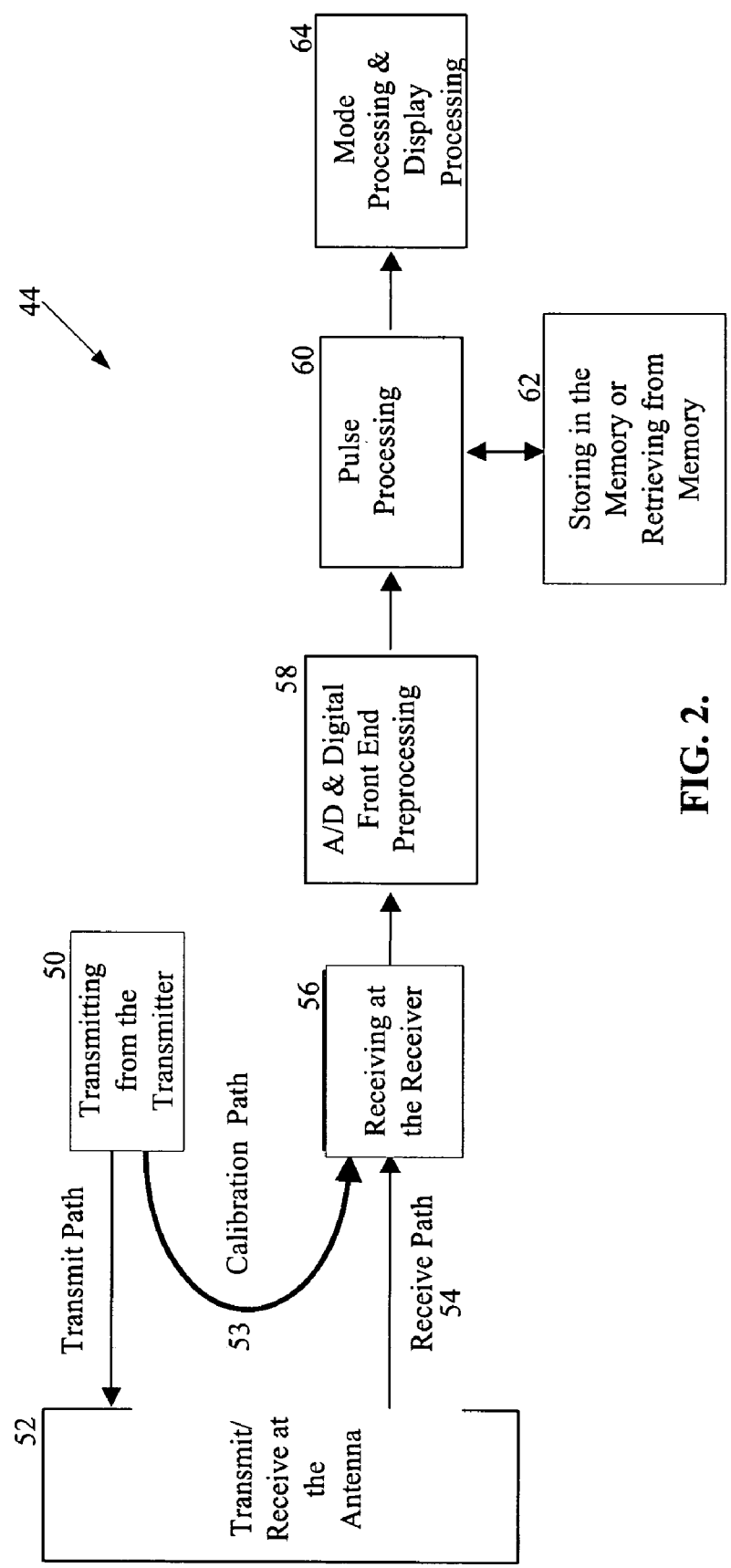
FIGS. 2–5 illustrate exemplary calibration processes performed by the system shown in FIG. 1.

Referring to FIG. 2, a process 44 performed by the radar system 10 is shown. At steps 50 and 52, the transmitter 11 generally sends pulse-compression waveforms out through the antenna 12. At certain times during a scan, the transmitter 11 instead sends one or more calibration waveforms directly to the receiver 15 via a calibration path 53. At step 56, the receiver 15 detects a signal arriving either from the antenna 12 via a receive path 54, or from the transmitter 11 via the calibration path 53. Both types of signals are sent to the radar processor 17 to undergo analog to digital conversion and front-end preprocessing at step 58. At step 60, additional pulse processing steps are then performed as appropriate for the type of signal being processed. In the case of a calibration signal being received by the receiver 15 and sent to the radar processor 17, a calibration filter is created and stored at step 62 in the memory 18. If a previously stored calibration filter is applied to a signal, then it is retrieved from the memory 18. In the case of a radar return signal being received by the receiver 15 and sent to the radar processor 17, pulse processing may include pulse compression and filtering with the stored calibration filter. The radar return signals then undergo further mode processing and display processing as needed at step 64.

Because the calibration filter is created using the actual pulse-compression waveforms produced by the radar system 10, the radar system 10 is constantly adapting to any changes experienced by its components, such as temperature and pressure changes, which may lead to signal distortions in either the time or frequency domain. This also takes into consideration any distortions that may be created by non-linearities in the risetime of the transmitter 11 or errors in channels, which may vary for different waveforms. The calibration path 13 and the receive path 14 must be phase and amplitude matched to within the desired final accuracy of the system.

Figure 3:
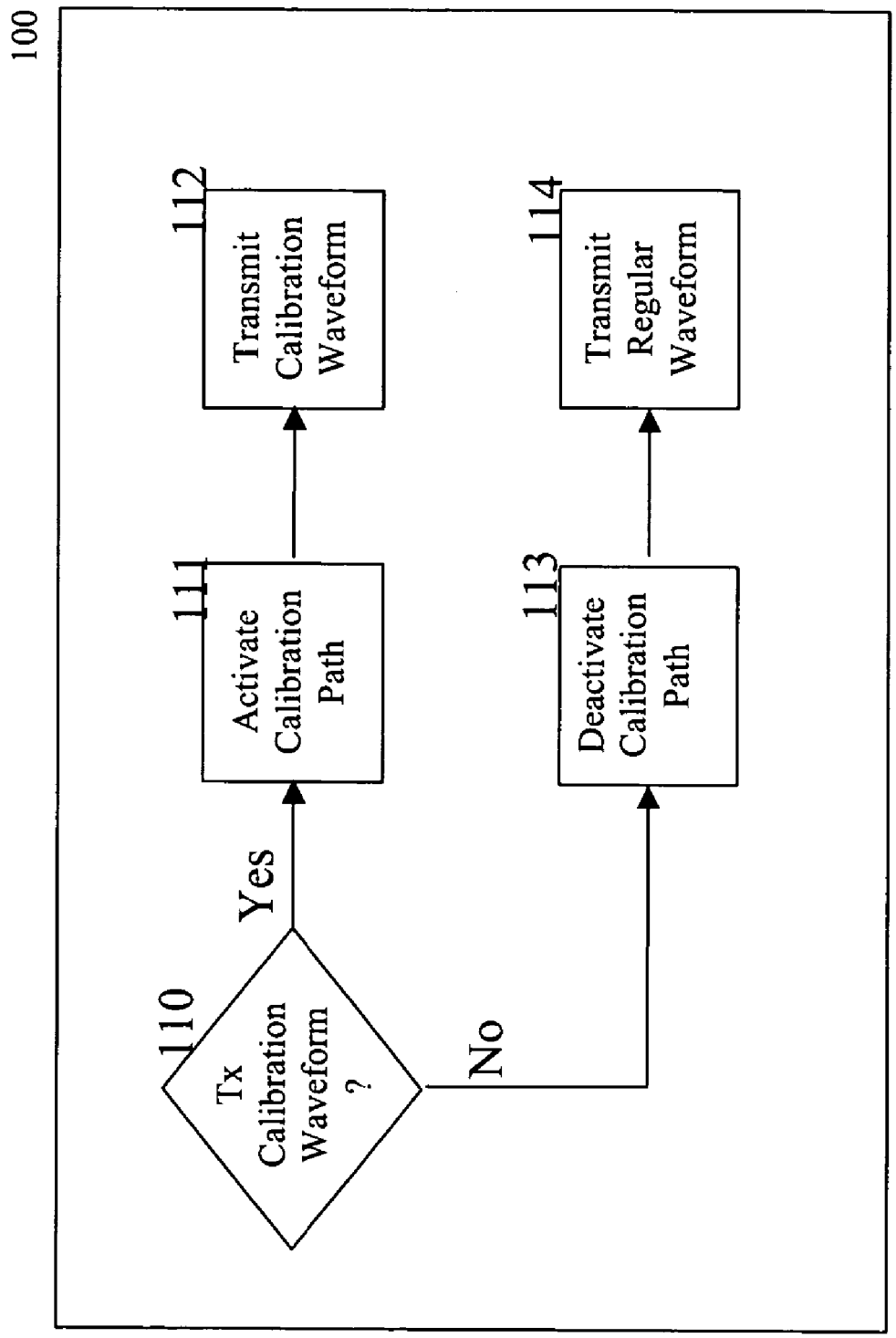

FIG. 3 illustrates a signal transmission process 100 performed by the transmitter 11 in FIG. 1. The process 100 is performed during normal operation of the pulse-compression radar system 10. Thus, as soon as the radar system 10 is activated (i.e. starts transmitting radar pulses) the process 100 begins at decision block 110 where it is determined if it is the proper time or place in the radar scan to perform calibration. In one embodiment, the time or place in the scan where the calibration is performed is at the end of each radar scan cycle. The calibration can be performed any number of times during a scan. If it is determined that it is not the time or place where calibration is to be performed, the calibration path 13 is deactivated at step 113 and the pulse compression waveform is transmitted at step 114 via the antenna 12. If, at decision block 110, it is the time or place where calibration is to be performed, the calibration path 13 is activated at step 111 and the calibration waveform is transmitted at step 112 directly to the receiver 15. In one embodiment, the calibration waveform is transmitted via the antenna 12 as well as being sent directly to the receiver 15.

Figure 4:
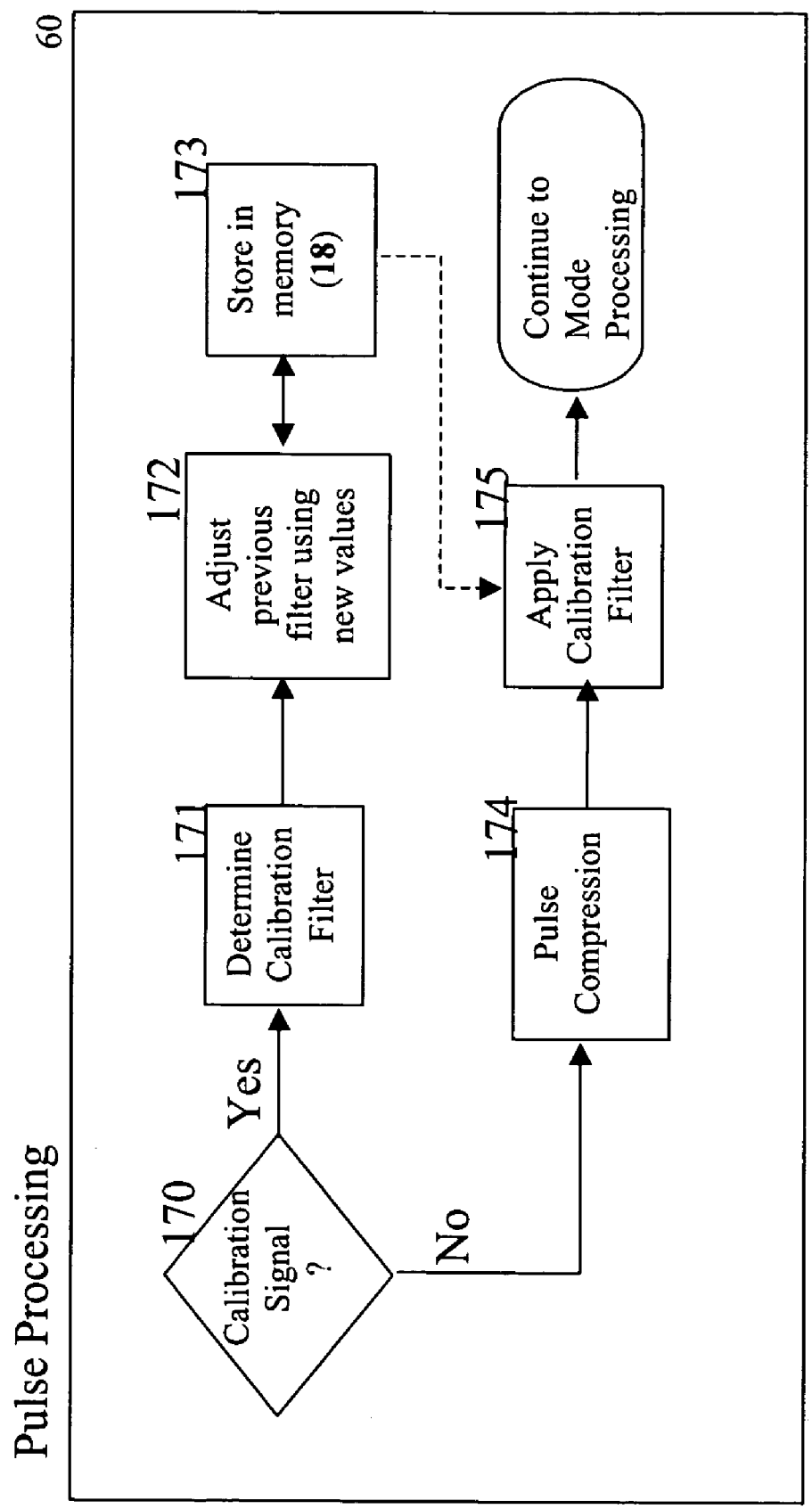

FIG. 4 shows the process of step 60 in FIG. 1. After undergoing analog to digital conversion and front-end preprocessing at step 58 it is determined at decision block 170 whether the signal is a calibration signal or a received radar signal. If the signal is a calibration signal a calibration filter is calculated at step 171. In one embodiment newly calculated filter coefficients that define the calibration filter are then used to update the previously stored filter coefficients (see step 172) using an equation such as the example equation shown in Equation (1).

$$\text{UpdatedFilter} = A * \text{PreviousFilter} + (1-A) * \text{NewFilter} \quad (1)$$

Where A is a scalar between 0 and 1 and is determined based on system parameters. The resulting filter coefficients are stored at step 173 in the memory 18.

If it is determined in decision block 170 that the signal is a received pulse compression radar signal the signal undergoes pulse compression at step 174 followed by application of the most recently stored calibration filter at step 175. In one embodiment the filter is applied in the frequency domain by multiplying the pulse-compressed radar signal with the coefficients of the calibration filter. In another embodiment the calibration filter may be applied in the time domain. In yet another embodiment the calibration filter may be applied to the radar signal in either the time domain or frequency domain before the radar signal undergoes pulse-compression.

After pulse compression and the application of the calibration filter, the radar signal is further processed according to its mode or type (weather, windshear, etc.), step 64, before a final radar display is presented to the flight crew or other users.

Figure 5:
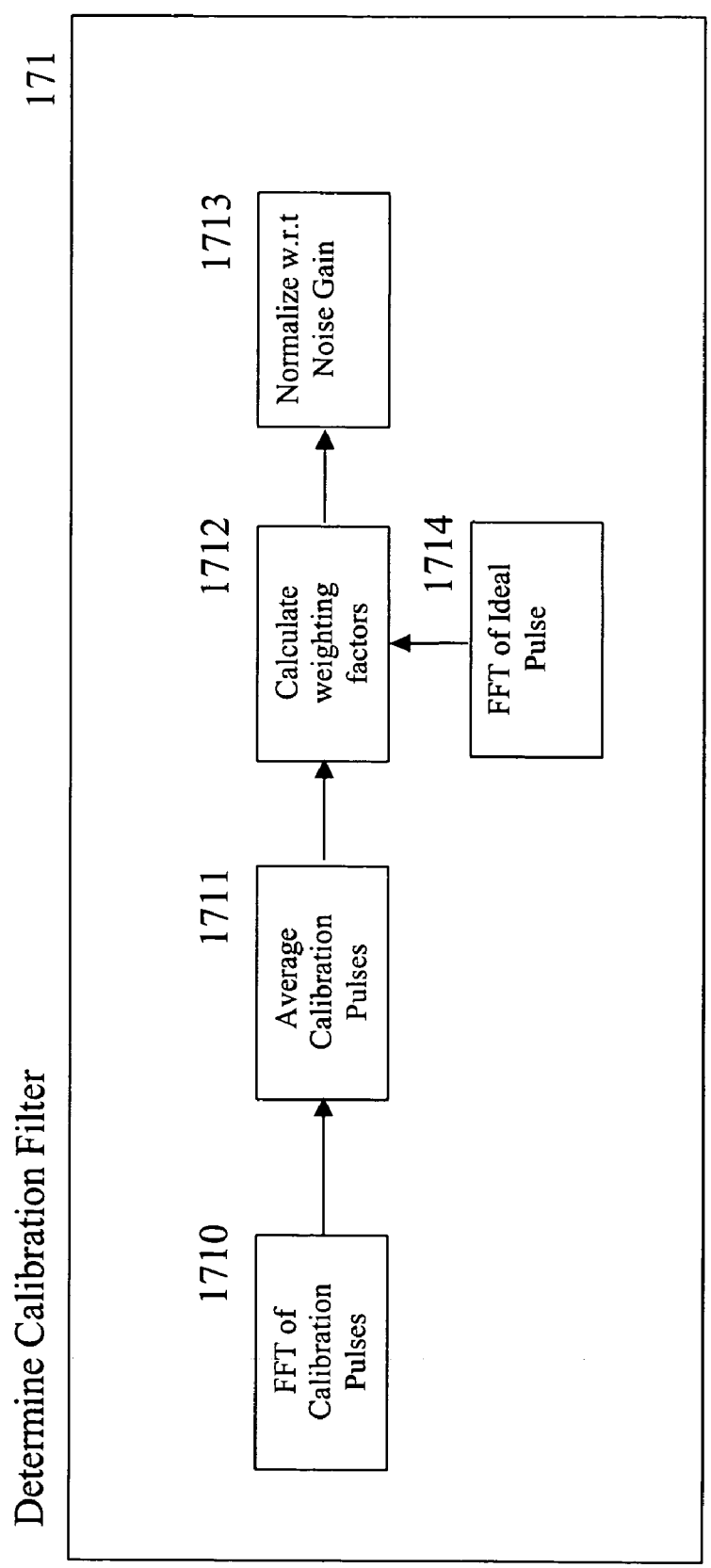

FIG. 5 illustrates the calculation of the calibration filter performed at step 171 (FIG. 4). In step 171, the calibration filter is determined based on the signal received by the receiver 15 and a previously determined ideal signal. The ideal signal is the expected result of performing all front end preprocessing stages on an ideal pulse.

At step 1710, each pulse in the received signal is converted to the frequency domain, preferably using a Fast Fourier Transform (FFT). At step 1711, if multiple calibration pulses have been received, the calibration pulses for each pulse type are averaged at each frequency. Next, at step 1712, a set of calibration weighting factors is determined based on the ideal signal in the frequency domain, see step 1714. Equation (2) is an example equation for generating the calibration weighting factors as performed in step 1712 of FIG. 5:

$$W = \frac{I \cdot C^* + N}{C \cdot C^* + N} \quad (2)$$

Where
W = the set of frequency domain calibration weighting factors
I = the ideal signal (in the frequency domain)
C = the average of the calibration pulses at each frequency
C* = the complex conjugate of C
N = an estimate of the noise power of the calibration path Finally, at step 1713, the calibration weighting factors are normalized with respect to noise gain to create the calibration filter. Equation (3) is an example equation for normalizing the calibration weighting factors with respect to noise gain.

$$calFilter_n = W_n \sqrt{\frac{\sum_{k=1}^{k=\text{fftsize}} |PC_k|^2}{\sum_{k=1}^{k=\text{fftsize}} |PC_k|^2 \cdot |W_k|^2}} \quad n = 1, 2, \cdots, \text{fftsize} \quad (3)$$

Figure 6:
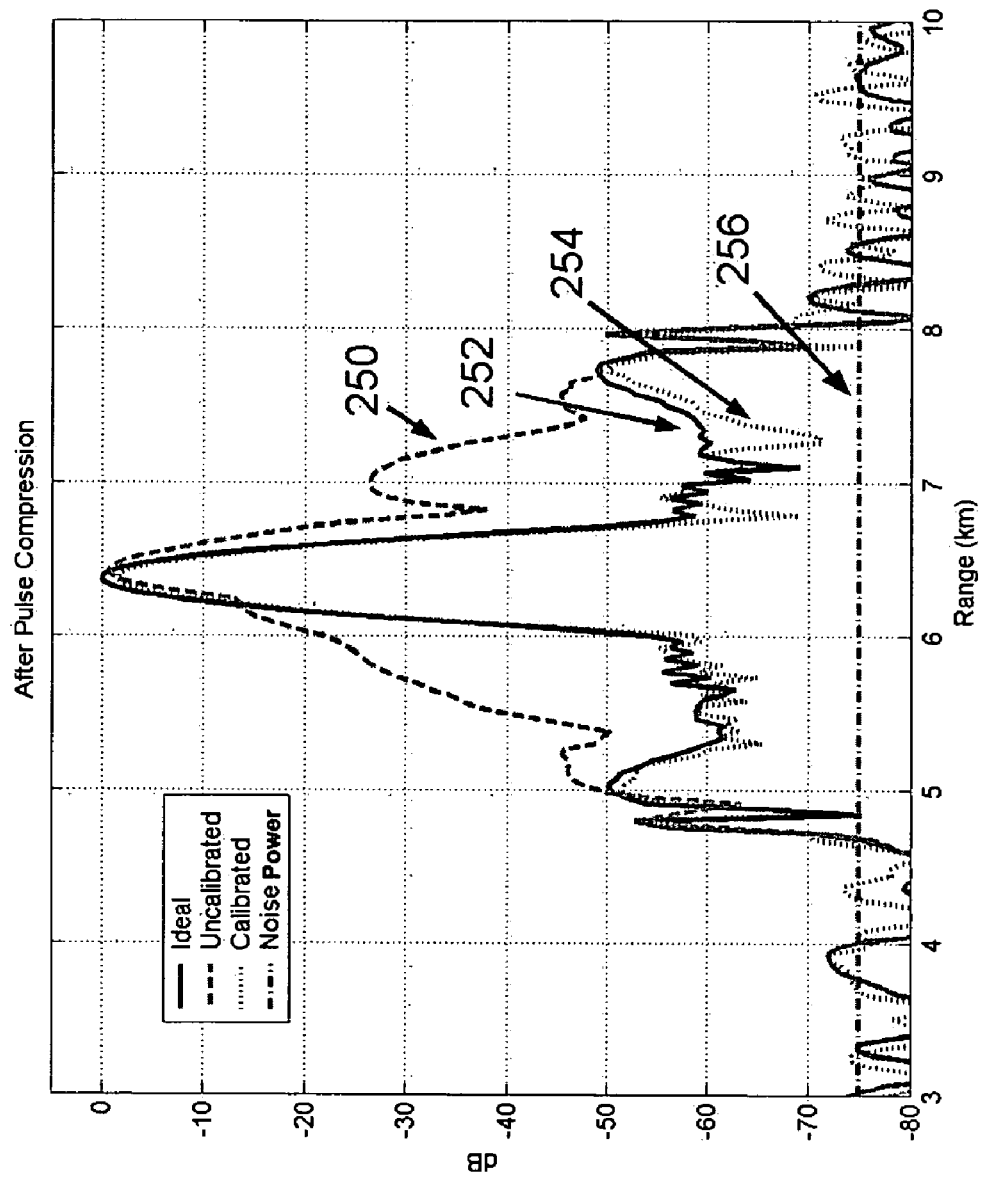
FIG. 6 illustrates a pre-calibrated signal and post-calibrated signal.

Where
W = the set of calibration weighting factors found in Equation (2)
PC = the frequency domain pulse compression filter coefficients for this pulse
CalFilter = the resulting normalized frequency domain calibration filter coefficients FIG. 6 illustrates a graph of an uncalibrated pulse-compressed pulse 250, an ideal pulse-compressed pulse 252 and a pulse-compressed pulse 254 that has been calibrated using the calibration filter. The uncalibrated signal 250 includes numerous unwanted side lobes that are removed by application of the calibration process that is described above. The noise power is indicated by 256.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    generating a calibration filter based on a calibration pulse-compression signal received at a receiver from a transmitter, an estimate of noise, and a previously defined ideal signal; and
    generating a calibrated signal by applying the generated calibration filter to reflected pulse-compression signals that are received at the receiver from an antenna.

2. The method of claim 1, wherein the calibration pulse-compression signal bypasses the antenna.

3. The method of claim 1, wherein generating a calibration filter is further based on previously generated associated calibration filters.

4. The method of claim 1, wherein generating the calibration filter comprises:
    generating a digital signal based on the calibration pulse-compression signal;
    generating a frequency domain signal based on the generated digital signal; and generating a set of weighting factors based on the frequency domain signal, the ideal signal, and the estimate of noise.

5. The method of claim 4, wherein generating a calibration filter comprises normalizing the weighting factors with respect to noise gain.

6. The method of claim 1, wherein the calibration pulse-compression signal is processed by radar front end processing components.

7. The method of claim 1, further comprising displaying an image based on the calibrated signal.

8. An apparatus comprising:
a means for generating a calibration filter based on a calibration pulse-compression signal received at a receiver from a transmitter, an estimate of noise, and a previously defined ideal signal; and
a means for generating a calibrated signal by applying the generated calibration filter to reflected pulse-compression signals that are received at the receiver from an antenna.

9. The apparatus of claim 8, wherein the calibration pulse-compression signal bypasses the antenna.

10. The apparatus of claim 8, wherein the means for generating the calibration filter generates the calibration filter further based on previously generated calibration filters.

11. The apparatus of claim 8, wherein the means for generating the calibration filter comprises:
a means for generating a digital signal based on the calibration pulse-compression signal;
a means for generating a frequency domain signal based on the generated digital signal; and
a means for generating a set of weighting factors based on the frequency domain signal, the ideal signal, and the estimate of noise.

12. The apparatus of claim 11, wherein the means for generating the calibration filter comprises a means for normalizing the weighting factors with respect to noise gain.

13. The apparatus of claim 8, wherein the calibration pulse-compression signal is processed by radar front end processing components.

14. The apparatus of claim 8, further comprising a display for displaying an image based on the calibrated signal.

15. A computer program product residing on a computer-readable medium, the computer program product comprising:
a component for generating a calibration filter based on a calibration pulse-compression signal received at a receiver from a transmitter, an estimate of noise, and a previously defined ideal signal; and
a component for generating a calibrated signal by applying the generated calibration filter to reflected pulse-compression signals that are received at the receiver from an antenna.

16. The product of claim 15, wherein the calibration pulse-compression signal bypasses the antenna.

17. The product of claim 15, wherein the component for generating the calibration filter generates the calibration filter further based on previously generated associated calibration filters.

18. The product of claim 15, wherein the component for generating the calibration filter comprises:
a component for generating a digital signal based on the calibration pulse-compression signal;
a component for generating a frequency domain signal based on the generated digital signal; and
a component for generating one or more weighting factors of the frequency domain signal based on the ideal signal and the estimate of noise.

19. The product of claim 18, wherein the component for generating the one or more weighting factors further comprises a component for normalizing the one or more weighting factors with respect to noise gain.

20. The product of claim 15, wherein the calibration pulse-compression signal is processed by radar front end processing components prior to being used by the component for generating the one or more weighting factors.

21. The product of claim 15, further comprising a component for preparing an image for display based on the calibrated signal.

22. A self calibrating radar system that includes a radar signal generator, the system comprising:
an antenna;
a receiver in signal communication with the antenna;
a transmitter in signal communication with the antenna, the radar signal generator, and the receiver, the transmitter generates a pulse-compression waveform and a calibration pulse-compression waveform based on pulse-compression signals sent by the radar signal generator, wherein the pulse-compression waveform is transmitted to the antenna and the calibration pulse-compression waveform is transmitted to the receiver, wherein the antenna receives a reflection of the transmitted pulse-compression waveform and sends the reflection of the transmitted pulse-compression waveform to the receiver; and
a radar processor in signal communication with the receiver, the radar processor comprising:
a component configured to generate a a calibration filter based on the calibration pulse-compression signal received by the receiver, an estimate of noise, and a previously defined ideal signal; and
a component configured to generate a calibrated radar signal by applying the generated calibration filter to the reflected pulse-compression signal received by the antenna.

23. The system of claim 22, wherein the component configured to generate the calibration filter generates the calibration filter further based on previously generated associated calibration filters.

24. The system of claim 22, wherein the component configured to generate the calibration filter comprises:
a digital to analog converter configured to generate a digital signal based on the calibration pulse-compression signal;
a fast Fourier Transform component configured to generate a frequency domain signal based on the generated digital signal; and
a component configured to generate one or more weighting factors based on the frequency domain signal, the ideal signal, and the estimate of noise.

25. The system of claim 24, wherein the component configured to generate the calibration filter comprises a component configured to normalize the one or more weighting factors with respect to noise gain.

26. The system of claim 22, wherein the calibration pulse-compression signal is processed by radar front end processing components.

27. The system of claim 22, further comprising a display for displaying an image based on the calibrated signal.

* * * * *